United States Patent Office 3,379,542
Patented Apr. 23, 1968

3,379,542
GLASS-CERAMICS
Peter William McMillan and Brian Purdam Hodgson, Stafford, England, assignors to The English Electric Company Limited, London, England, a British company
No Drawing. Filed May 27, 1963, Ser. No. 283,599
Claims priority, application Great Britain, Oct. 12, 1962, 38,700/62
3 Claims. (Cl. 106—39)

ABSTRACT OF THE DISCLOSURE

A glass-ceramic product consisting essentially of about 7 to 9 weight percent $Li_2O$, 11 to 13 weight percent ZnO, 47 to 60 weight percent $SiO_2$, 14 to 30 weight percent PbO, 2.4 to 2.7 weight percent $P_2O_5$ and 1.6 to 2 weight percent $K_2O$. It has been found that a glass-ceramic product of this novel composition has a very good dielectric strength and a low dielectric loss angle over a wide range of frequencies. It also has a high strength and a high thermal expansion coefficient compatible with that of copper, a low melting temperature and good working properties in the glass phase and a straight-line thermal expansion characteristic.

---

This invention relates to glass-ceramics and to processes for the production thereof.

According to the present invention a glass-ceramic product consists essentially of about 7 to 9 weight percent $Li_2O$, 11 to 13 weight percent ZnO, 47 to 60 weight percent $SiO_2$, 14 to 30 weight percent PbO, 2.4 to 2.7 weight percent $P_2O_5$ and 1.6 to 2 weight percent $K_2O$.

The batch materials are thoroughly mixed before melting and the batch is then melted in a crucible of the fireclay, sillimanite or high zircon type using either electric or gas-fired melting furnaces, to produce a glass.

The batch should be melted in an oxidizing atmosphere, e.g. in air, and the melting temperature should be between 1200 and 1400° C. in accordance with the composition, the temperature being such as to result in a homogeneous melt.

The glasses should then be worked by the normal methods employed in glass working, such as casting, drawing or pressing, and are then annealed at a suitable temperature, when the glasses may be allowed to cool to room temperature prior to heat-treatment. Alternatively, the glasses may be heat-treated directly after working without being annealed and allowed to cool.

The glasses are heat-treated in two stages, and in the first stage are heated in a furnace at the rate of up to 10° C. per minute, and preferably at 3–5° C. per minute, to approximately the $M_g$ point of the glass as determined dilatometrically, preferably within ±10° of the $M_g$ point, which in the case of the glasses concerned in the present invention lies in the range 440–520° C., depending on the composition.

The $M_g$ point, or upper annealing temperature, is defined as the temperature at which the viscosity is $10^{11}$–$10^{12}$ poises.

If the samples are to be heat-treated directly after annealing, they are transferred to a furnace maintained at this temperature. This temperature is maintained for at least one hour, during which nuclei are formed in the glass and the process of crystallization is begun.

The glasses are then heated at a rate not exceeding 10° C. per minute and preferably at 3–5° C. per minute to the final crystallization temperature, which varies from 700° C. to 900° C. depending on the glass composition. This temperature is usually selected to be somewhat below the temperature at which the lowest-melting-point crystal phase begins to melt. The glass is maintained at the final crystallization temperature for at least one hour, during which crystallization develops in the glass and a dense ceramic product containing closely interlocking crystals is formed. The articles are then allowed to cool at a rate not exceeding 10° C. per minute, and preferably at the normal cooling rate of the furnace.

The ceramic materials formed by this process are microcrystalline and may be formed without deformation occurring during the heat-treatment process. The nucleation heat-treatment results in the development of the crystallization to such an extent that the glasses remain substantially rigid during the final heat-treatment at the higher temperature. The mechanical strengths of the ceramic materials thus formed are good, and the materials are good electrical insulators.

Two specific examples of the production of ceramic articles in accordance with the invention will now be described.

In the first example batch materials were melted to form a glass having the following composition:

| | Percent |
|---|---|
| $Li_2O$ | 9.0 |
| ZnO | 13.1 |
| $SiO_2$ | 59.2 |
| PbO | 14.0 |
| $P_2O_5$ | 2.7 |
| $K_2O$ | 2.0 |

The batch was melted at 1300° C. The glass was then worked and annealed as above described and the articles so formed were heat-treated by raising the temperature at 5° C. per minute to an initial nucleation temperature of 500° C., which was held for two hours. The temperature of the articles was then raised at 5° C. per minute to a final crystallization temperature of 725° C., which was held for one hour, and the articles were then allowed to cool to room temperature in the furnace.

The ceramic thus formed had a thermal expansion coefficient over the range 20–500° C. of $145 \times 10^{-7}$ per degree C., and had a modulus of rupture of between 30,000 and 35,000 lb./sq. in. when measured using three-point loading with a loading length of 1.5 inches and a sample 4–5 millimetres in diameter. This ceramic was found to be a good electrical insulator, having a dielectric loss angle of between $8.5 \times 10^{-4}$ and $5.3 \times 10^{-4}$ at frequencies between 10 kc./s. and 1000 mc./s. The dielectric constant for this range of frequencies was between 5.8 and 5.9.

In the second example a batch was melted at a temperature of 1225° C. to produce a glass having the following composition:

| | Percent |
|---|---|
| $Li_2O$ | 7.3 |
| ZnO | 11.0 |
| $SiO_2$ | 47.8 |
| PbO | 29.9 |
| $P_2O_5$ | 2.4 |
| $K_2O$ | 1.6 |

After working and annealing as described above, the articles so formed were heat-treated by raising the temperature at 5° C. per minute to an initial nucleation temperature of 440° C., which was held for one hour. The temperature of the articles was then raised at 5° C. per minute to a final crystallization temperature of 700° C., which was held for one hour, the articles being allowed to cool in the furnace.

The ceramic thus produced had a coefficient of thermal expansion over the range 20–500° C. of $127 \times 10^{-7}$ per degree C., and also had a high mechanical strength.

What we claim as our invention and desire to secure by Letters Patent is:

1. A substantially completely thermally devitrified glass-ceramic product consisting essentially of about 7 to 9 weight percent $Li_2O$, 11 to 13 weight percent ZnO, 47 to 60 weight percent $SiO_2$, 14 to 30 weight percent PbO, 2.4 to 2.7 weight percent $P_2O_5$ and 1.6 to 2 weight percent $K_2O$ having a dielectric loss angle of less than about $8.5 \times 10^{-4}$ at 10 kc./s.

2. A substantially completely thermally devitrified glass-ceramic product consisting essentially of about 9 weight percent $Li_2O$, 13.1 weight percent ZnO, 59.2 weight percent $SiO_2$, 14.0 weight percent PbO, 2.7 weight percent $P_2O_5$ and 2.0 weight percent $K_2O$ having a dielectric loss angle of less than about $8.5 \times 10^{-4}$ at 10 kc./s.

3. A substantially completely thermally devitrified glass-ceramic product consisting essentially of about 7.3 weight percent $Li_2O$, 11.0 weight percent ZnO, 47.8 weight percent $SiO_2$, 29.9 weight percent PbO, 2.4 weight percent $P_2O_5$ and 1.6 weight percent $K_2O$ having a dielectric loss angle of less than about $8.5 \times 10^{-4}$ at 10 kc./s.

References Cited
UNITED STATES PATENTS

| | | | |
|---|---|---|---|
| 2,049,765 | 8/1936 | Fischer | 252—301.4 |
| 2,097,275 | 10/1937 | Fischer | 252—301.4 |
| 2,099,602 | 11/1937 | Fischer | 252—301.4 |
| 2,219,895 | 10/1940 | Hanlein | 106—39 |
| 2,920,971 | 1/1960 | Stookey | 106—39 |
| 2,971,853 | 2/1961 | Stookey | 106—39 |
| 3,063,198 | 11/1962 | Babcock | 106—39 |
| 3,117,881 | 1/1964 | Henry et al. | 106—39 |
| 3,170,805 | 2/1965 | McMillan et al. | 106—39 |
| 3,238,085 | 3/1966 | Hayami et al. | 106—39 |

OTHER REFERENCES

Hinz, "Chemical Abstracts," Item 12615c, July 10, 1959, "Vitrokeram."

Eitel et al., "Glastechnische Tabellen," pub. 1932 by Springer, Berlin (page 41).

Weyl, "Conditions of Glass Formation Among Simple Compounds," Glass Industry, January 1961 (pages 23–25, 28).

Weyl et al., Glass Industry, February 1961, "Conditions of Glass Formation Among Simple Compounds" (pages 76–81).

HELEN M. McCARTHY, *Primary Examiner.*

TOBIAS E. LEVOW, *Examiner.*